Dec. 23, 1930.  H. E. STONEBRAKER  1,786,271
CASE FOR CLINICAL THERMOMETERS
Filed Sept. 16, 1929

INVENTOR
Harold E. Stonebraker,

Patented Dec. 23, 1930

1,786,271

UNITED STATES PATENT OFFICE

HAROLD E. STONEBRAKER, OF ROCHESTER, NEW YORK

CASE FOR CLINICAL THERMOMETERS

Application filed September 16, 1929. Serial No. 392,930.

This invention relates to improvements in thermometer cases, and particularly to cases for thermometers of the kind known as clinical thermometers.

The principal object of the invention is to construct a case for thermometers of this kind which is simple in construction, inexpensive to make, and which will reduce to a minimum the liability of breakage.

Another object of the invention is to construct a case for thermometers of this kind which will effectively reduce or prevent breakage and which is so constructed that it does not obscure the thermometer scale.

A still further object of the invention is to provide a case for thermometers of this kind which will reduce breakage, which does not obscure the thermometer scale, and which has a part that protects the thermometer bulb and that can be detached without disturbing the other parts thereof while the thermometer is in use.

To these and other ends, the invention consists in the construction and arrangement of parts that will appear from the following description when read in conjunction with the accompanying drawings, the novel features being pointed out in the claims following the specification.

Figure 3:
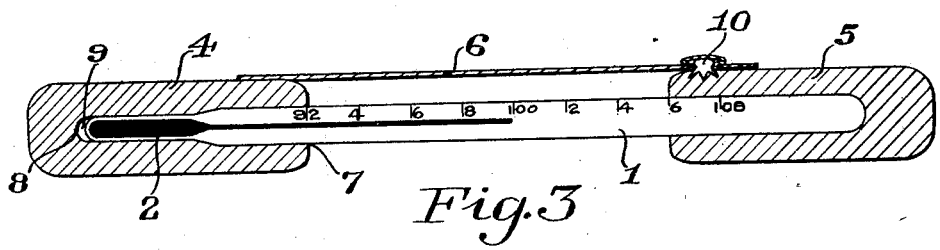
Figure 3 is a central longitudinal section through the case, showing the position of the thermometer therein.

Referring specifically to the drawings, in which similar reference numerals refer to the same parts in all the figures, a clinical thermometer is illustrated, best shown in Figure 3, and which comprises a tubular member or shank 1 closed at its upper end, and at the lower end the tube is expanded to form a reservoir or bulb 2 in which a quantity of mercury is confined. The walls of the bulb are relatively thin in order that the temperature of the mercury contained therein may be readily subjected to that of the mouth of the patient in contact therewith.

Formed on the shank above the bulb is a graduated scale which indicates the temperature of the bulb in degrees. Usually in this class of thermometers, a constriction is formed in the tube just above the bulb which retains the mercury thereabove, so that the thermometer continues to register properly the maximum temperature to which the bulb has been subjected even after the bulb has cooled. Before a new test can be made, it is necessary to shake or jar the instrument in order to return any surplus mercury retained above the constriction to the bulb.

These instruments are usually constructed of glass and being smooth frequently slip from the hand when being shaken down, and since the wall of the bulb is very thin, usually results in a broken instrument. For the purpose of protecting the thermometer against such accidental breakage, a casing is provided which comprises two parts 4 and 5 connected by any suitable means, such as a strap, cord, or band 6.

The part 4 of the casing is constructed of resilient material, such as rubber or the like. It is preferably cylindrical in form, although it may be prismatic in form to prevent rolling when laid on a smooth surface. The part 4 has a central bore or opening extending longitudinally thereof and open at its inner end 7 and closed at its outer end 8. The bore is larger at its open inner end to engage the body of the thermometer, and smaller at its closed outer end to engage the bulb, as shown in Figure 3 of the drawings. The smaller end of the bore is of a length somewhat greater than the length of the bulb of the thermometer, so that it is adapted to resiliently engage the lower end of the shank, and since the small bore is somewhat longer than the bulb of the thermometer, it engages the lower end of the shank and stops the movement of the thermometer into the casing before the lower end of the bulb reaches the end of the bore, thus providing a space or chamber 9 in the end of the bore.

The part 5 is provided to protect the upper end of the thermometer, and in its principal characteristics is similar to the part 4, except that its bore is of the same diameter throughout its depth, so that when placed on the thermometer the end of the thermometer engages the closed end of the bore.

Since the parts 4 and 5 of the casing are made of resilient material, it will be understood that by making the openings therein which engage the shank slightly smaller than the diameter of the shank, the shank may be resiliently engaged thereby with sufficient force to maintain the casing parts in position on the thermometer under ordinary circumstances.

In some cases however, it may be desirable to provide means for more positively securing the casing parts to the thermometer. To this end, the strap 6 is provided, which may be of any suitable material such as cotton, silk, or leather, or may be an elastic band, in which case it would act to pull the ends of the casing toward each other against the ends of the thermometer.

As shown, the strap 6 is permanently secured to one of the casing parts, as 4, by cement or other suitable or convenient means, and is detachably connected or secured to the other part by means of a button or clasp 10, but any suitable fastening means would serve the purpose. The clasp 10 illustrated comprises a button member secured in the casing wall and a socket member secured to the strap adjacent its end and adapted to resiliently engage the button.

When a thermometer is protected in a casing such as described, the liability of breakage from accidents, such as dropping or falling, is reduced to a minimum. The ends are so encased in resilient material that it is almost impossible for it to strike against an unprotected portion, and the shocks from impact are absorbed before reaching the delicate instrument encased therein. It will also be noted that the thinner walls of the bulb are protected by a thicker wall of the resilient material and also by the air cushion formed in the chamber 9.

It will be noted that a portion of the shank of the thermometer between the ends 4 and 5 is left bare to expose the scale thereon. By this arrangement, the mercury can be shaken down while the thermometer is in the casing, the cooperation of the mercury column with the scale being observable through the exposed part. When a test is to be made, it is only necessary to remove the part 4 to expose the bulb, the part 5 remaining on the other end of the shank still offering some protection to the thermometer in case of accident.

Figure 1:
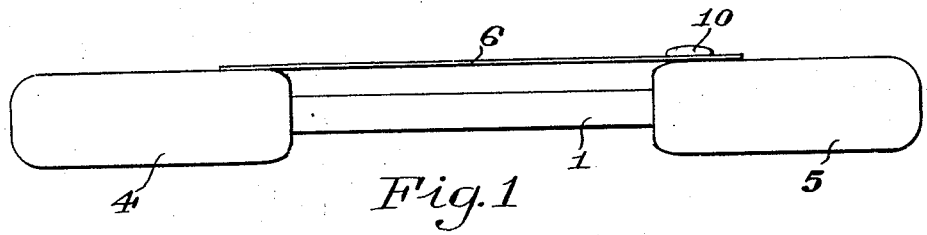
Figure 1 is a side elevation of a clinical thermometer illustrating one possible way of carrying out the invention.
Figure 2:
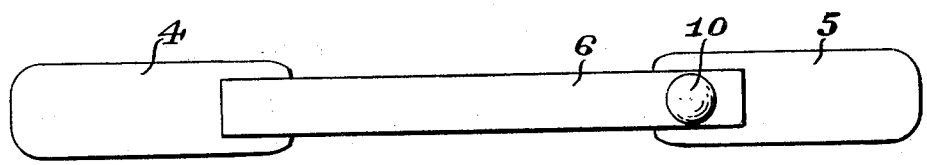
Figure 2 is a plan view of the same.
Figure 4:
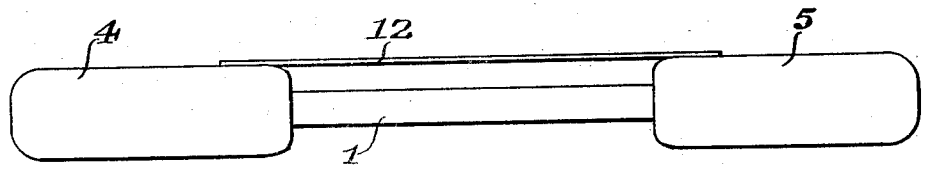
Figure 4 is a side elevation of a clinical thermometer illustrating another possible way of carrying out the invention.

In Figure 4 is illustrated another way of connecting the parts 4 and 5 of the casing. In this instance, an elastic strap 12 has its ends secured to the parts 4 and 5 by any suitable means, as by cementing, and holds them resiliently in engagement with the ends of the thermometer. In this arrangement, one of the parts must be withdrawn from the end of the thermometer against the resiliency of the strap, after which the other can also be disengaged therefrom.

While only two ways of carrying out the invention are shown and described herein, it will be understood that this application is intended to cover all such changes or modifications as may come within the spirit of the invention or scope of the following claims.

I claim:

1. A case for a breakable thermometer comprising two parts constructed of resilient material and adapted to be frictionally arranged upon and entirely supported by the opposite ends of the thermometer, one of said parts having a bore of approximately the diameter of the corresponding portion of the thermometer and closely embracing the outer surface of the thermometer end throughout a substantial portion of the length of the thermometer, the body wall of said part being of sufficient thickness to afford such a degree of resiliency as to prevent breakage of the thermometer when falling on a hard surface.

2. A case for a breakable thermometer comprising two parts constructed of resilient material and adapted to be frictionally arranged upon and entirely supported by the opposite ends of the thermometer, each of said parts having a bore of approximately the diameter of the corresponding portion of the thermometer and closely embracing the outer surface of the thermometer end throughout a substantial portion of the length of the thermometer, the body wall of each of said parts being of sufficient thickness to afford such a degree of resiliency as to prevent breakage of the thermometer when falling on a hard surface.

3. A case for a breakable thermometer comprising two parts constructed of resilient material and adapted to be frictionally arranged upon and entirely supported by the opposite ends of the thermometer, each of said parts having a bore of approximately the diameter of the corresponding portion of the thermometer and closely embracing the outer surface of the thermometer end throughout a substantial portion of the length of the thermometer, the body wall of each of said parts being of sufficient thickness to afford such a degree of resiliency as to prevent breakage of the thermometer when falling on a hard surface, the inner ends of said parts of the case being spaced from each other when in operative position and the thermometer being unencased between said inner ends of the parts of the case whereby a portion of the thermometer scale between said parts is unobstructed and can be viewed without removing either part of the case.

4. A case for a breakable thermometer comprising two parts constructed of resilient material and adapted to be frictionally arranged upon and entirely supported by the opposite ends of the thermometer, one of said parts having a bore which for a portion of its length is of approximately the diameter of the body portion of the thermometer and for a portion of its length is of approximately the diameter of the bulb of the thermometer and closely embracing the outer surface of the thermometer end throughout a substantial portion of the length of the thermometer, the body wall of said part being of sufficient thickness to afford such a degree of resiliency as to prevent breakage of the thermometer when falling on a hard surface.

5. A case for a breakable thermometer comprising two parts constructed of resilient material and adapted to be frictionally arranged upon and entirely supported by the opposite ends of the thermometer, one of said parts having a bore of approximately the diameter of the body of the thermometer and the other of said parts having a bore which for a portion of its length is of approximately the diameter of the body portion of the thermometer and for a portion of its length is of approximately the diameter of the bulb of the thermometer, each of said parts closely embracing the outer surface of the thermometer end throughout a substantial portion of the length of the thermometer and the body wall of each of said parts being of sufficient thickness to afford such a degree of resiliency as to prevent breakage of the thermometer when falling on a hard surface, the inner ends of said parts of the case being spaced from each other when in operative position and the thermometer being unencased between said inner ends of the parts of the case whereby a portion of the thermometer scale between said parts is unobstructed and can be viewed without removing either part of the case.

In witness whereof, I have hereunto signed my name.

HAROLD E. STONEBRAKER.